United States Patent [19]

Cannet et al.

[11] Patent Number: 5,678,602
[45] Date of Patent: Oct. 21, 1997

[54] GAS CONTROL AND DISPENSING ASSEMBLY AND GAS STORAGE DEVICE EQUIPPED WITH SUCH AN ASSEMBLY

[75] Inventors: Gilles Cannet, Parmain; Emmanuel Fano, La-Varenne-Saint-Hilaire; Alain Robin, Paris, all of France

[73] Assignee: L'Air Liquide, Societe Anonyme Pour L'Etude et L'Exploitation Des Procedes Georges Claude, Paris Cedex, France

[21] Appl. No.: 637,725
[22] PCT Filed: Aug. 25, 1995
[86] PCT No.: PCT/FR95/01122
 § 371 Date: Aug. 12, 1996
 § 102(e) Date: Aug. 12, 1996
[87] PCT Pub. No.: WO96/07843
 PCT Pub. Date: Mar. 14, 1996

[30] Foreign Application Priority Data

Sep. 2, 1994 [FR] France .................. 94 10543

[51] Int. Cl.⁶ .................................. F16K 31/12
[52] U.S. Cl. ............... 137/505.25; 137/500; 137/613; 251/263; 251/206; 251/121

[58] Field of Search ................... 137/500, 495, 137/590, 505.25, 613; 251/121, 206, 263

[56] References Cited

U.S. PATENT DOCUMENTS

| | | | |
|---|---|---|---|
| 3,885,589 | 5/1975 | Iung | 137/613 |
| 4,011,893 | 3/1977 | Bentley . | |
| 4,655,246 | 4/1987 | Phlipot | 251/206 |
| 5,566,713 | 10/1996 | Lhomer | 137/505.25 |
| 5,597,021 | 1/1997 | Crossdale | 137/590 |

FOREIGN PATENT DOCUMENTS

| | | |
|---|---|---|
| 744450 | 4/1933 | France . |
| 1540575 | 8/1968 | France . |
| 2619432 | 2/1989 | France . |

Primary Examiner—Denise L. Ferensic
Assistant Examiner—Ramyar M. Farid
Attorney, Agent, or Firm—Young & Thompson

[57] ABSTRACT

Gas control and dispensing assembly comprising a lower unit (1) which is mounted on a gas tank (4) and houses a regulator (10, 9) and an upper unit (5) which is mounted on the lower unit (1) via a threaded ring (24) and houses an indexed flowmeter valve (14, 43) upstream of a low pressure gas outlet (19). The invention is suitable for transportable gas tanks and vehicle-body integrated gas tanks.

11 Claims, 1 Drawing Sheet

GAS CONTROL AND DISPENSING ASSEMBLY AND GAS STORAGE DEVICE EQUIPPED WITH SUCH AN ASSEMBLY

FIELD OF THE INVENTION

The present invention relates to a gas control and dispensing assembly, intended to be mounted on a tank or storage device containing the gas under a medium or high pressure, comprising an upstream part, having an axis, for connection to the tank, a low-pressure gas outlet and, in a gas circuit between the connection part and the low-pressure gas outlet, a pressure reducer means and a flow regulator means.

BACKGROUND OF THE INVENTION

The basics of an assembly of this type are described in document WO-93/20383 in the name of the Applicant Company, which moreover describes an intermediate gas container, which can be refilled at a refilling station and can be transported in a chassis allowing it to be coupled to a user device.

SUMMARY OF THE INVENTION

The object of the present invention is to provide a control and dispensing assembly of the type defined above, which is of simple and reliable design, is in a compact and ergonomic form, and is suitable for all types of gas storage devices and, quite particularly, for the intermediate containers, equipped with a chassis, according to the above document.

In order to do this, according to one aspect of the invention, the reducer means is arranged in the connection part and the regulator means and the low-pressure gas outlet are arranged in a downstream part, coaxially with the upstream part and securable to the latter in an arbitrary relative angular position with respect to the axis.

According to other characteristics of the invention:
  the downstream part is secured to the up-stream part via a ring having an internal screw thread cooperating with a threaded end of one of the parts and an annular shoulder cooperating with an axial stop formed on the other part;
  the flow regulator means comprises an indexable equipment item rotating in the downstream part and in an indexing cap fixed on the downstream part by a low-pressure gas outlet connector;
  the upstream part comprises a straight cylindrical screw thread for connection to a cylindrical internal screw thread of the tank.

With an arrangement according to the invention, the upstream part, on which there are a number of outlet connectors, can be positioned angularly in a selected configuration which facilitates connection of the outlets to their downstream circuits and, independently of this positioning of the upstream part, the downstream part, on which the low-pressure outlet connector and the indexable knurled wheel of the flow meter are located, can be positioned relative to the upstream part in a suitable configuration, also selected relative to its surroundings, in particular in a cover according to the abovementioned document.

According to other particular characteristics of the invention:
  the assembly comprises means for temporary connection between the rotating equipment item and the reducer means for selectively actuating the latter;
  the reducer means comprises a sliding equipment item consisting of a valve and a piston, and the connection means comprise a cam means, carried by the rotating equipment item of the flow regulator means and selectively cooperating with the piston of the reducer means.

With such an arrangement, the "shut-off tap" function of the flow pressure-reducer means, conventionally obtained by an unpierced region of the rotating barrel, is here positively provided by closing the cap of the mobile equipment item of the reducer means by forced displacement of the latter against its control spring.

According to another characteristic of the invention, the upstream part includes a filling gas passage separate from the gas circuit.

Such an arrangement makes it possible to protect the constituent components of the control and dispensing assembly from risks of adiabatic compression when the tank is being filled, if it is necessary to do this, according to local standards, through the same passage in the tank as the gas outlet passage.

BRIEF DESCRIPTION OF THE DRAWINGS

Other characteristics and advantages of the present invention will emerge from the following description of embodiments which are given by way of illustration but without implying any limitation, this description being given in conjunction with the appended drawings, in which.

DETAILED DESCRIPTION OF THE INVENTION

Figure 1:
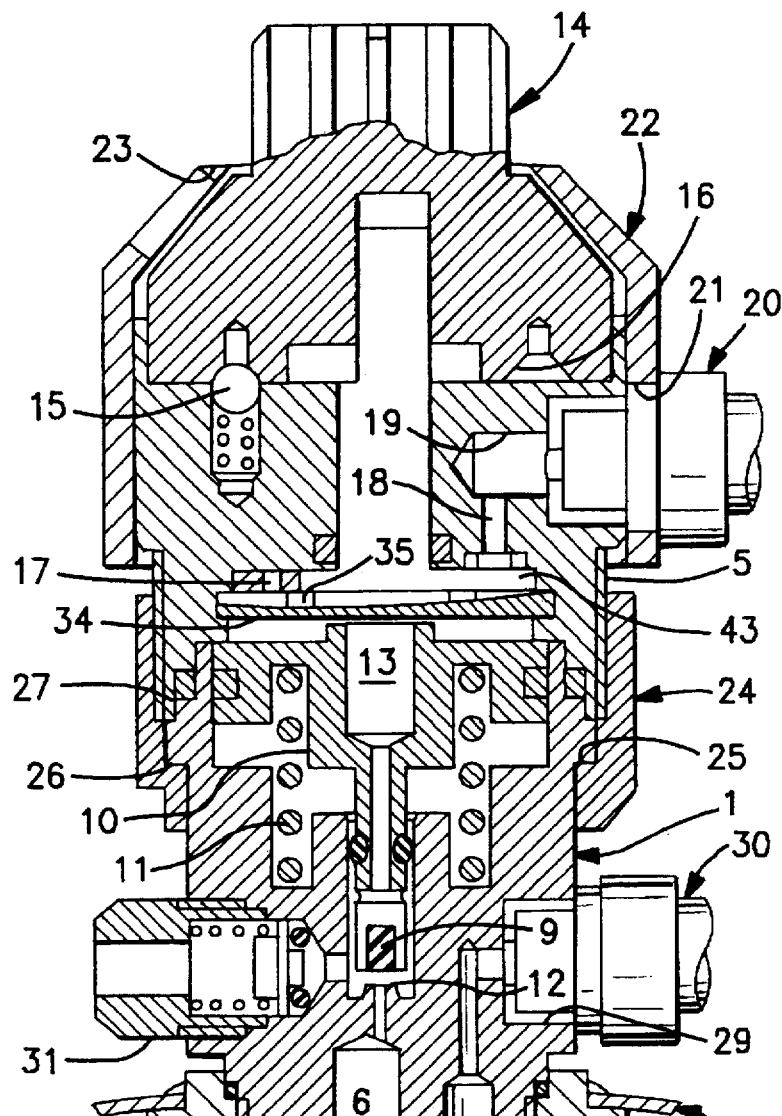
FIG. 1 is a schematic view in longitudinal section of a gas control and dispensing assembly according to the invention, mounted on a tank.

In the embodiment represented, an assembly according to the invention typically comprises an up-stream part, or lower block 1, having a longitudinal axis, comprising a threaded cylindrical lower end 2 for mounting it in an internally threaded passage 3 in a pressurized gas tank 4, and a downstream part, or upper unit 5, mounted coaxially on the lower unit 1, in extension of the latter.

The lower unit 1 comprises a lower stepped bore 6 used for mounting a filter/non-return valve assembly 7 and communicating with an upper bore 8 in which slides the stem, carrying an end valve 9, of a piston 10 of an axially mobile equipment item of a reducer means comprising a calibrated spring 11 which normally separates the valve 9 from its seat 12, formed in the bottom of the bore 8. The piston 10 comprises a central gas passage 13 establishing communication between the upper face of the piston 10 and the bore 8.

In the upper unit 9, a barrel 43 is mounted so as to rotate about the axis of the assembly, this barrel being movable in rotation by an actuation knurled wheel 14 immobilizable in defined angular positions by an elastically stressed rod 15, carried by the upper unit 5 and cooperating with angularly distributed openings 16 formed in the knurled wheel 14. The barrel 43 comprises a series of angularly distributed passages 17 of different cross-sections which, in the successive indexing positions, become aligned with an axial calibrated passage 18 formed in the unit 5 and opening into a transverse passage 19 which opens to the exterior and is intended to accommodate a low-pressure gas outlet connector 20. The connector 20 is mounted in the upper unit 5 by passing through an opening 21 of corresponding dimensions, formed in a peripheral skirt of a cover 22 enclosing the majority of the knurled wheel 14 and of the upper body 5 and comprising a cut-out 23 forming a window through which it is possible to view graduations or numbers formed on the knurled wheel 14 and indicating the respective angular positions of the barrel 43, and therefore the low-pressure gas flow rates flowing from the bore 6 to the passage 19 via the central bore 8, the passage 13 in the piston, one of the calibrated passages in the barrel 43 and the axial passage 18 in the upper body 5.

According to one aspect of the invention, the upper body 5 is mounted, in an arbitrary relative angular position, on the lower body 1 by means of a ring 24 which is fitted over the lower body 1 and abuts, via an inner radial shoulder 25, against an outer radial stop 26 on the lower body 1. In the embodiment represented, the ring 24 comprises an internally threaded upper part which cooperates with a threaded lower end part 27 of the upper unit 5, sealed relative to the upper end part of the lower unit 1 by an O-ring seal.

With such an arrangement, as mentioned above, it is possible to mount and lock the lower unit 1 in the tank 4 in a selected angular position suitable for connecting the various outlets to the downstream circuits, and the upper unit 5, also in an arbitrary defined position relative to the unit 1, suitable in particular for reading the flow rate indications through the window 23.

Figure 2:
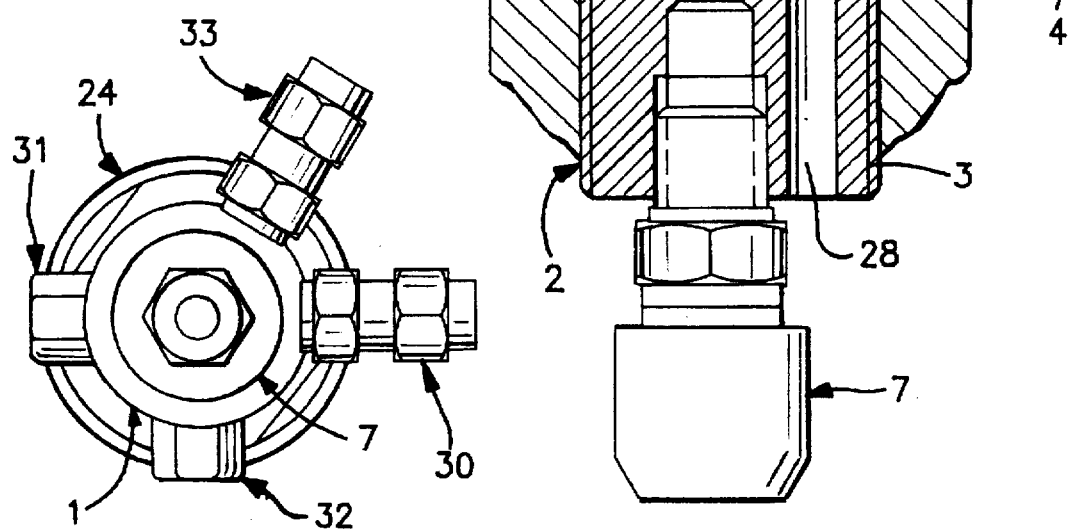
FIG. 2 is an end view, from below, of the assembly in FIG. 1.

According to one aspect of the invention, as is seen in FIGS. 1 and 2, the lower unit 1 comprises an additional stepped bore 28, laterally offset from the main bore 6 and opening into a transverse passage 29 used for mounting a non-return filling connector 30 making it possible to fill the tank 4 without passing through the gas outlet circuit of the assembly. A low-pressure safety valve 31 is mounted in a transverse passage, facing the passage 29, opening into the bore 8. Advantageously, as is seen in FIG. 2, a high-pressure safety valve 32 and a connector 33 for connection to a manometer, are mounted in transverse passages in the lower body 1 which communicate with the passage 6 or the passage 28.

According to one aspect of the invention, the "shut-off tap" function fulfilled by the unperforated sector of the barrel 43 is supplemented by a positive actuation of the piston 10 against the action of the spring 11 in order to press the valve 9 on its seat 12 and thus isolate the passage 6 from the upstream portions of the gas outlet circuit. As is seen in FIG. 1, an elastic leaf 34, for example consisting of a thin bevelled steel rod, mounted in the upper unit 5, extends transversely above a front end of the piston 10, not normally opposing axial displacement of the latter. Two cam elements 35 are arranged on the front face of the barrel 43 and can, in the vicinity of the angular position of the barrel corresponding to the shut-off position, cooperate with the leaf 34 to push it axially downwards and thereby also to push the piston 10 downwards, against the action of the spring 11, in order to press the valve 9 onto its seat 12, thus producing double isolation between the outlet passage 19 and the inlet passage 6. The engagement of the cams 35 on the leaf 34 furthermore gives the user a hard-point sensation which allows the zero flow rate position to be located by touch, in addition to the visual indication in the window 23.

Although the present invention has been described with reference to particular embodiments, it is in no way limited thereby, but on the contrary is susceptible of modifications and variants which will occur to the person skilled in the art, within the scope of the claims which follow.

We claim:

1. Gas control and dispensing assembly, intended to be mounted on a tank containing gas under pressure, comprising an upstream part having an axis including a connection part for the tank, a low-pressure gas outlet and, in a gas circuit between the connection part and the gas outlet, a pressure reducer means and a flow regulator means, said reducer means being arranged in the connection part and the regulator means and the low-pressure gas outlet being arranged in a downstream part, coaxially with the upstream part and securable to the latter in an arbitrary relative angular position with respect to the axis, said flow regulator means comprising an indexable equipment item rotating in the downstream part, and means for temporary connection between the rotating equipment item of the flow regulator means and the reducer means for selectively actuating the reducer means.

2. Gas control and dispensing assembly according to claim 1, wherein the downstream part is secured to the upstream part via a ring having an internal screw thread cooperating with a threaded end of one of the upstream and downstream parts, and an annular shoulder cooperating with an axial stop formed on the other part.

3. Gas control and dispensing assembly according to claim 1, further comprising an indexing cap fixed on the downstream part by a low-pressure gas outlet connector.

4. Gas control and dispensing assembly according to claim 1, wherein the reducer means comprising a sliding equipment item consisting of a valve and a piston, and the means for temporary connection comprise a cam means, carried by the rotating equipment item of the flow regulator means and selectively cooperating with the piston.

5. Gas control and dispensing assembly according to claim 1, wherein the upstream part comprises a straight cylindrical screw thread for connection to a cylindrical internal screw thread of the tank.

6. Gas control and dispensing assembly according to claim 1, wherein the upstream part includes a filling gas passage separate from the gas circuit.

7. Gas storage device comprising a gas tank equipped with a gas control and dispensing assembly according to claim 1.

8. A gas flow control and dispensing apparatus, comprising a body part having an axis, a rear end, and a front end adapted to be received in a port of a gas cylinder, the body part housing a pressure reducer means, a rear part secured coaxially to the rear end of the body part, the rear part including a gas outlet and a flow regulator means comprising a rotating adjusting member, wherein the rotating adjusting member is partly enclosed in a cover structure surrounding part of the rear part and held in place by a gas outlet fitting mounted in the gas outlet of the rear part; and coupling means for selectively mechanically coupling the flow regulator means to the pressure reducer means.

9. A gas flow control and dispensing apparatus, comprising a body part having an axis, a rear end, and a front end adapted to be fixedly received in a port of a gas cylinder, the body part housing a pressure reducer means, a rear part secured coaxially to the rear end of the body part, the rear part including a gas outlet and a flow regulator, the front end defining a first fluid flow passage communicating with the pressure reducer means via a valve seat, coupling means for selectively mechanically coupling the flow regulator to the pressure reducer means and a second fluid flow passage, separate from the first fluid flow passage, opening into a side part of the body part and adapted to receive a one-way filling nipple for replenishing the cylinder with gas under pressure.

10. The apparatus of claim 9, wherein the first fluid flow passage is equipped with a non-return valve assembly.

11. The apparatus of claim 10, wherein the non-return valve assembly is mounted externally in prolongation of the front end.

* * * * *